US009692239B2

(12) United States Patent
Drobnik et al.

(10) Patent No.: US 9,692,239 B2
(45) Date of Patent: Jun. 27, 2017

(54) METHOD FOR BATTERY EQUALIZATION

(71) Applicant: FREESCALE SEMICONDUCTOR, INC., Austin, TX (US)

(72) Inventors: Josef Drobnik, Austin, TX (US); Beatrice Bernoux, Austin, TX (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 15/089,888

(22) Filed: Apr. 4, 2016

(65) Prior Publication Data
US 2016/0218526 A1    Jul. 28, 2016

Related U.S. Application Data

(62) Division of application No. 13/770,170, filed on Feb. 19, 2013, now Pat. No. 9,337,670.

(51) Int. Cl.
*H02J 7/00* (2006.01)

(52) U.S. Cl.
CPC .......... *H02J 7/0014* (2013.01); *H02J 7/0018* (2013.01); *H02J 7/0021* (2013.01)

(58) Field of Classification Search
USPC ........................................ 320/118
See application file for complete search history.

(56) References Cited

U.S. PATENT DOCUMENTS

| 5,956,241 | A | 9/1999 | LoCascio | |
|---|---|---|---|---|
| 2011/0057617 | A1* | 3/2011 | Finberg | H02J 7/0016 320/118 |
| 2011/0227414 | A1* | 9/2011 | Fischer | H02J 7/0019 307/66 |
| 2011/0234164 | A1* | 9/2011 | Furukawa | H02J 7/0018 320/118 |
| 2013/0002203 | A1* | 1/2013 | Kuraishi | H02J 7/0019 320/134 |
| 2014/0042980 | A1* | 2/2014 | Floros | H02J 7/0016 320/134 |
| 2014/0152261 | A1* | 6/2014 | Yamauchi | B60L 11/1866 320/118 |
| 2014/0167683 | A1* | 6/2014 | Wade | G01R 31/3606 320/107 |

* cited by examiner

Primary Examiner — Mohammed Alam

(57) ABSTRACT

A battery equalization circuit is provided, including: a positive battery node connecting to a positive node of a battery cell in a battery circuit with a plurality of other battery cells; a negative battery node connected to a negative node of the battery cell; a transformer winding receiving an AC voltage, the transformer winding having an upper transformer node and a lower transformer node; an upper triac connected between the positive battery node and the upper transformer node; a lower triac connected between the negative battery node and the lower transformer node; a control circuit for controlling the upper triac and the lower triac based on a measured cell voltage between the positive battery node and the negative battery node, and a total battery voltage of the battery circuit; and an isolation element connected between the control circuit and a data bus.

20 Claims, 5 Drawing Sheets

METHOD FOR BATTERY EQUALIZATION

This application is a divisional application of a U.S. patent application entitled "Circuit and Method for Battery Equalization", having a Ser. No. 13/770,170, having a filing date of Feb. 19, 2013, having common inventors, and having a common assignee, all of which is incorporated by reference in its entirety.

FIELD OF THE INVENTION

The present invention relates in general to a system and method for controlling the equalization of battery cells in a multiple-cell battery. In particular it relates to a system and method for monitoring the voltage in each battery cell in a multiple-cell battery, as well as the in the battery as a whole, and for equalizing the voltages in each of the individual battery cells so that they are approximately the same.

BACKGROUND OF THE INVENTION

Some simple batteries are made up of a single cell having a single voltage. For example, a common A cell battery is made up of a single 1.5 volt cell. However, many other batteries are made up of multiple battery cells that are connected together in series. For example, a common car battery could be made up of six 2 volt cells connected in series, while a battery for a hybrid car might be made up of an array of battery cells, some in series and some in parallel. Likewise, an electronic device might employ a battery made of a chain of smaller batteries connected in series.

In multiple-cell batteries, small differences between the cells (e.g., due to production tolerances or operating conditions) tend to be magnified with each charge or discharge cycle. In these situations, weaker cells are overstressed during charging, causing them to become even weaker, until they eventually fail and cause a premature failure of the whole battery. Voltage equalization (sometimes called cell balancing) is a way of compensating for these weaker cells by equalizing the charge on all the cells in the battery, thus extending the battery's life. In addition, this process also serves to prevent the overcharging of individual cells.

Even in a relatively stable battery, small differences in charge, rate of discharge, cell parameters, and cell age can result in different cell voltages for individual cells after a few charge and discharge cycles, leading to undesirable stress on the battery as the individual cell voltages begin to slide out of synchronization.

Therefore, in order to obtain good performance and lifespan for most rechargeable batteries, such as Li-Ion batteries, each battery cell requires additional circuitry. The level of sophistication of these circuits varies widely and so does the cost. The simplest and lowest cost devices typically provide only passive equalization. In such a device, should the voltage of an individual cell exceed a preset level, a simple discharge circuit attached to the cell is activated to bring the cell voltage back to what is considered a "normal level." In such a device, any "excess" charge is wasted, typically turned into heat.

It would be desirable, therefore to provide a system and method of actively equalizing charge among cells in a multiple-cell battery. Such a system could periodically monitor the voltage in each battery cell in a battery or battery portion, and equalize the voltages in the batteries so that they all remain at the same voltage, or at least close to the same voltage. Furthermore, it would also be desirable if any charge removed from an overcharged battery were not wasted, but was instead moved to an undercharged battery instead, avoiding any wasted charge.

However, there is also a competing interest to keep the size, cost, and complexity of batteries low. Therefore, it would also be desirable for any active battery equalization system to be simple, energy-efficient small, and low cost.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, may be supported with or in integrated circuits (ICs), such as dynamic random access memory (DRAM) devices, static random access memory (SRAM) devices, or the like. In particular, they may be implemented using CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs will be limited to the essentials with respect to the principles and concepts used by the exemplary embodiments.

Battery Equalization Circuit

Figure 1:
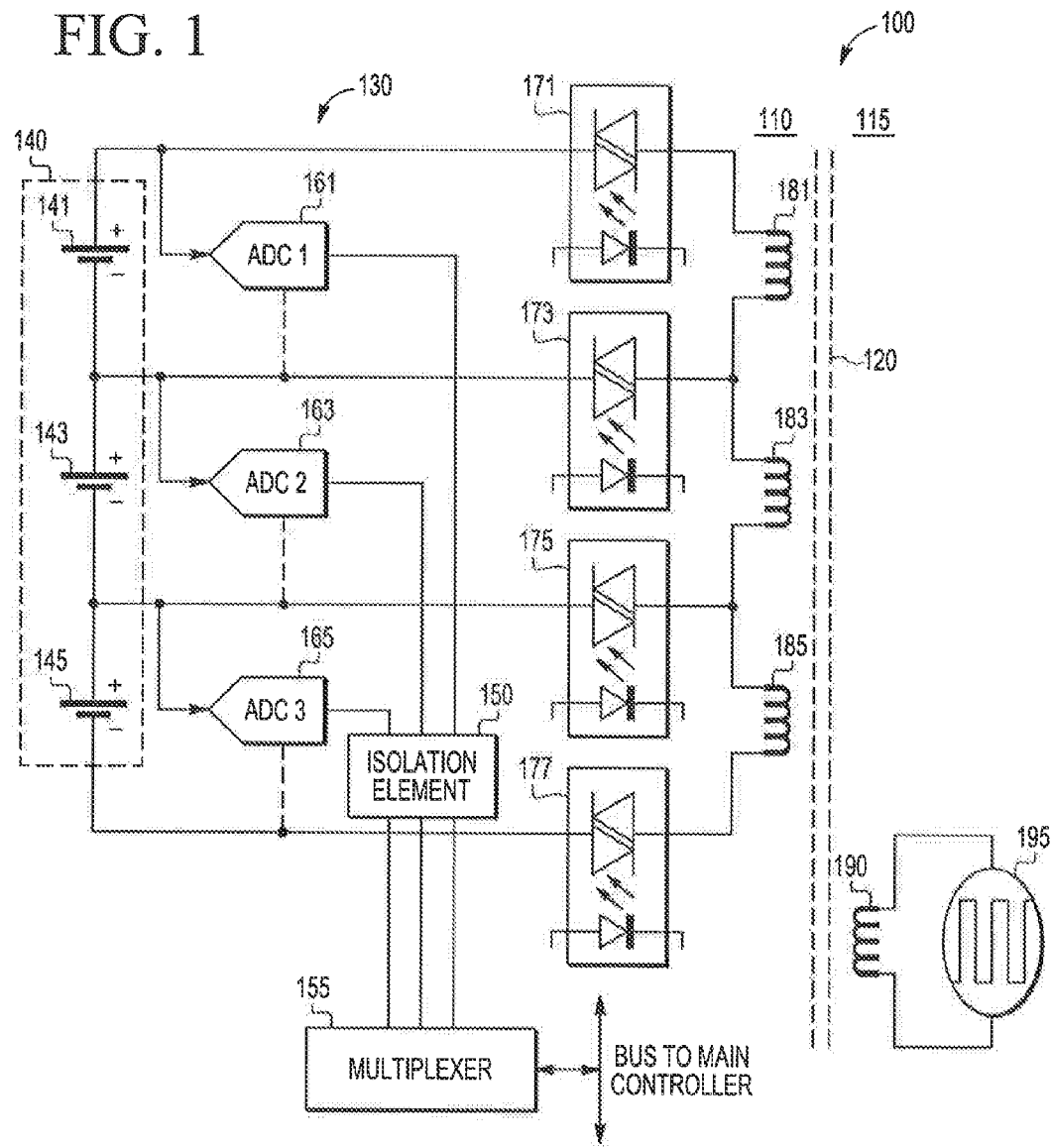
FIG. 1 is a circuit diagram of a multiple-cell battery and a battery equalization circuit according to a disclosed embodiment.

FIG. 1 is a circuit diagram of a multiple-cell battery and a battery equalization circuit 100 according to a disclosed embodiment. As shown in FIG. 1, the multiple-cell battery and a battery equalization circuit 100 is formed on a first side 110 and a second side 115 of a transformer core 120. A cell equalization circuit 130 is formed on the first side 110 of the transformer core 120 and is connected to a multiple-cell battery 140. An AC voltage source 135 is provided on the second side of the transformer core 120.

The cell equalization circuit 130 includes first through third voltage measuring circuits (VMCs) 151, 153, 155, first through third analog-to-digital converters (ADCs) 161, 163, 165, first through fourth triacs 171, 173, 175, 177, and first through third secondary transformer windings 181, 183, 185. The multiple-cell battery 140 includes first through third battery cells 141, 143, 145 connected in series with each other. The AC voltage source 135 includes a primary transformer winding 190 and an AC bi-directional power signal generator 195.

The first through third battery cells 141, 143, 145 are connected in series with each other to provide a total voltage of the multiple-cell battery 140. This total voltage is simply the sum of the individual cell voltages of the first through third battery cells 141, 143, 145.

The primary transformer winding 190 is connected to a first side of the transformer core 120, and is attached to the output of the AC bi-directional power signal generator 195. The AC signal generator 195 operates to generate an AC signal that is provided to the cell equalization circuit 130 through the transformer 120 via the primary transformer winding 190. In the disclosed embodiment, the AC signal is a square wave signal.

Although the embodiment disclosed with respect to FIG. 1 discloses the use of a square wave, other forms of bipolar power signals can be used in alternate embodiments for example a semi-square wave or any suitable bipolar power signal can be provided by the AC bi-directional power signal generator 195.

In the disclosed embodiment, the AC signal generator 195 is powered by the multiple-cell battery 140. The AC bi-directional power signal generator 195 receives the full voltage of the entire battery and converts it onto the AC signal (i.e., the square wave). Furthermore, by powering the AC signal generator 195 from the battery, the amplitude of the AC signal is proportional to the voltage of the battery. This makes it easier for an equalization control circuit to determine the optimal battery cell voltage.

The first through third voltage measuring circuits 151, 153, 155, are each connected between the positive and negative terminals of a respective one of the first through third battery cells 141, 143, 145. The first through third voltage measuring circuits 151, 153, 155 operate to respectively determine first through third analog voltages of each of the first through third battery cells 141, 143, 145.

The first through third ADCs 161, 163, 165, receive the first through third analog voltages from the first through third voltage measuring circuits 151, 153, 155, respectively, and to convert them into first through third digital voltages. These digital voltages are then provided to a control circuit (not shown).

The first through third secondary transformer windings 181, 183, 185 are connected in series with each other, and are each individually connected to a second side of the transformer core 120. Thus, each of the first through third secondary transformer windings 181, 183, 185 is connected to the primary winding 190 through the transformer core 120, and can receive the AC signal generated by the AC signal generator 195. Furthermore, the use of a transformer to pass this AC signal allows the cell equalization circuit 130 to be electrically isolated from the AC signal generator 195.

The first triac 171 is connected at one end to a first (top) node of the first secondary transformer winding 181 and at the other end to a positive terminal of the first battery cell 141. The second and third triacs 173, 175 are each connected at one end to a node between adjacent secondary transformer windings 181, 183, 185, and at the other end to a node between adjacent battery cells (i.e., where a positive terminal of one battery is connected to a negative terminal of another battery). The fourth triac 177 is connected at one end to a second (bottom) node of the third secondary transformer winding 183 and at the other end to a negative terminal of the third battery cell 145.

When activated, a triacs becomes conductive, allowing current to flow through it in either direction. Thus, in the cell equalization circuit 130, the triacs operate as bi-directional switches between the battery cells 141, 143, 145 and the secondary transformer windings 181, 183, 185. In this embodiment, the triacs 171, 173, 175, 177 are each optically-coupled triacs that are controlled by the operation of a light-emitting diode in the triac. Because of this, the triacs 171, 173, 175, 177 are electrically isolated from the control circuit (not shown) that controls the operation of the light-emitting diodes in the optically-coupled triacs 171, 173, 175, 177.

When adjacent pairs of triacs (e.g., the first and second triacs 171, 173; the second and third triacs, 173, 175; and the third and fourth triacs 175, 177) are activated, a respective battery cell 141, 143, 145 is connected to its respective secondary transformer winding 181, 183, 185, allowing it to receive the AC voltage generated by the AC signal generator 195. This allows the selected battery cell to either be charged or discharged based on the polarity of the AC signal generated by the AC signal generator 195. Furthermore, there is no need for any additional control signals to turn the triacs 171, 173, 175, 177 off, since the triacs 171, 173, 175, 177 automatically shut down when they encounter a zero crossing. At such a zero crossing, the current through a given triac will be zero, which will be below its holding current, causing it to become non-conductive.

Although the system of FIG. 1 is shown with a multiple-cell battery 140 that has three battery cells 141, 143, 145, in alternate embodiments the multiple-cell battery 140 could have more or fewer cells. In such cases, the cell equalization circuit 130 would be modified accordingly to include a summer, an ADC, a triac, and a secondary transformer winding for each cell in the multiple-cell battery.

A battery equalization circuit is provided, comprising: a first positive battery node configured to connect to a positive node of a first monitored battery cell contained in a battery circuit that includes a plurality of other battery cells connected in series with the first monitored battery cell; a first negative battery node configured to connect to a negative node of the first monitored battery cell; a first transformer winding configured to receive an output voltage of an AC generator, the first transformer winding having a first upper transformer node and a first lower transformer node; a first upper triac connected between the first positive battery node and the first upper transformer node; a first lower triac connected between the first negative battery node and the first lower transformer node; and a multiplexers configured to control the operation of the first upper triac and the first lower triac based on instructions received from a central control unit, wherein the instructions received from the central control unit are generated based on a first measured cell voltage between the first positive battery node and the first negative battery node, and a total battery voltage of the battery circuit.

The first upper triac and the first lower triac may both be optically-coupled triacs.

The first monitored battery cell and the plurality of other battery cells may all be configured to have the same preset voltage, and the total battery voltage of the battery circuit may be determined by measuring a voltage of all of the first monitored battery cell and the plurality of other battery cells arranged in series with each other, and dividing the resulting voltage by a total number of battery cells, including the first monitored battery cell and the plurality of other battery cells.

The battery equalization circuit may further comprise: a first analog-to-digital converter connected between the first positive battery node and the first negative battery node, and configured to determine a first analog cell voltage, and to convert the first analog cell voltage into a first digital cell voltage, wherein the central control circuit uses the first digital cell voltage as the first measured cell voltage.

The battery equalization circuit may further comprise: a first switch connected between the first positive node and a voltage-measurement node; a cluster analog-to-digital converter connected the voltage-measurement node, and configured to determine a first analog cell voltage at the first positive node when the first switch is closed, and to convert the first analog cell voltage into a first digital cell voltage; and a cluster isolation element for electrically isolating the cluster analog-to-digital converter from the multiplexer, wherein
the multiplexer controls the operation of the first switch.

The battery equalization circuit may further comprise: a second positive battery node configured to connect to a positive node of a second monitored battery cell selected from the plurality of other battery cells connected in series with the first monitored battery cell; a second negative battery node configured to connect to a negative node of the second monitored battery cell; a second transformer winding configured to receive the output voltage of the AC generator, the second transformer winding having a second upper transformer node and a second lower transformer node; and a triac connected between the second positive battery node and the second upper transformer node, wherein the multiplexer is further configured to control the operation of the second triac based on further instructions received from a central control unit, wherein the further instructions received from the central control unit are generated based on a second measured cell voltage between the second positive battery node and the second negative battery node, and the total battery voltage of the battery circuit. The second triac may be an optically-coupled triac.

The battery equalization circuit may further comprise: a second analog-to-digital converter connected between the second positive battery node and the second negative battery node, and configured to determine a second analog cell voltage, and to convert the second analog cell voltage into a second digital cell voltage, wherein the central control circuit uses the second digital cell voltage as the second measured cell voltage.

The battery equalization circuit may further comprise: a second switch connected between the second positive node and the voltage-measurement node; wherein the cluster analog-to-digital converter is further configured to determine a second analog cell voltage at the second positive node when the second switch is closed, and to convert the second analog cell voltage into a second digital cell voltage, and the multiplexer controls the operation of the second switch.

Voltage Equalization Graph

Figure 2:
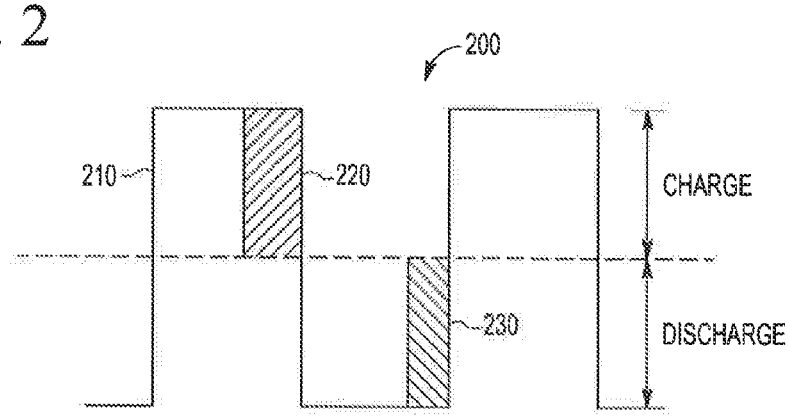
FIG. 2 is a graph of a square wave output by the AC voltage source in FIG. 1, along with an indication as to how it is used to charge and discharge individual battery cells, according to a disclosed embodiment.

FIG. 2 is a graph of a square wave output by the AC voltage source 135 in FIG. 1, along with an indication as to how it is used to charge and discharge individual battery cells, according to a disclosed embodiment. As shown in FIG. 2, the AC bi-directional voltage source 135 generates a square wave 210, which has a positive half above zero volts, and a negative half below zero volts. In particular, half of the squares generated by the AC bi-directional voltage source 135 have a negative voltage, while the other half have a positive voltage.

One exemplary cycle of the square wave 210 starts at time $T_1$ with a zero crossing from −A volts to +A volts. The square wave 210 is maintained at +A volts until time $T_2$, when another zero crossing takes the square wave 210 from +A volts to −A volts. Then, the square wave 210 is maintained at −A volts until time $T_3$, when another zero crossing takes the square wave 210 from −A volts back to +A volts, at which point a new cycle begins.

In operation, portions of the square wave with the positive voltage +A are used to charge battery cells 141, 143, 145 in the multiple-cell battery 140 when they are undercharged. Similarly, portions of the square wave with the negative voltage −A are used to discharge battery cells 141, 143, 145 when they are overcharged. This allows the individual voltages of the battery cells 141, 143, 145 to be adjusted up and down as needed to allow them to more easily maintain a similar voltage (although the current between the AC power source 135 and the battery 140 is limited by some system parameters).

For example, if the first battery cell 141 had a low voltage and needed to be charged, a battery controller would activate the first and second triacs 171, 173 to connect the first battery cell 141 to the AC voltage source 135 (e.g., through a transformer, as shown in FIG. 1) at a time $T_P$. The first battery call 141 would accumulate a first charge amount 220 until the zero crossing at $T_2$, at which point the triacs 171, 173 would turn off, isolating the first battery cell 141 from the AC voltage source 135. In this way, the first battery cell 141 would be charged by the first charge amount 220 provided by the square wave 210 from time $T_P$ to $T_2$.

Similarly, if the second battery cell 143 had a high voltage and needed to be discharged, the battery controller would activate the second and third triacs 173, 175 to connect the second battery cell 143 to the AC voltage source 135 (e.g., through a transformer, as shown in FIG. 1) at a time $T_N$. The second battery call 143 would lose a second charge amount 230 until the zero crossing at $T_3$, at which point the triacs 173, 175 would turn off, isolating the second battery cell 143 from the AC voltage source 135. In this way, the second battery cell 143 would be discharged by the second charge amount 230 (from the negative voltage) drained by the square wave 210 from time $T_N$ to $T_3$. The charge is returned through the transformer and you bidirectional AC/DC circuitry to the battery 140

Since the times $T_P$ and $T_N$ can be varied, this system allows a desired amount of charge to be added or subtracted from one of the battery cells 141, 143, 145. All that is necessary is to set the time $T_P$ to achieve a desired first charge amount 220 to be added to the selected battery cell, or the time $T_N$ to achieve a desired second charge amount 230 to be subtracted from the selected battery cell.

In some embodiments, the battery cells in a multiple-cell battery will be further divided into a plurality of multiple-cell clusters. In this way, individual cell equalization clusters can be provided, each of which operates on the battery cells in a particularly battery cluster.

Voltage Equalization Cluster

Figure 3:
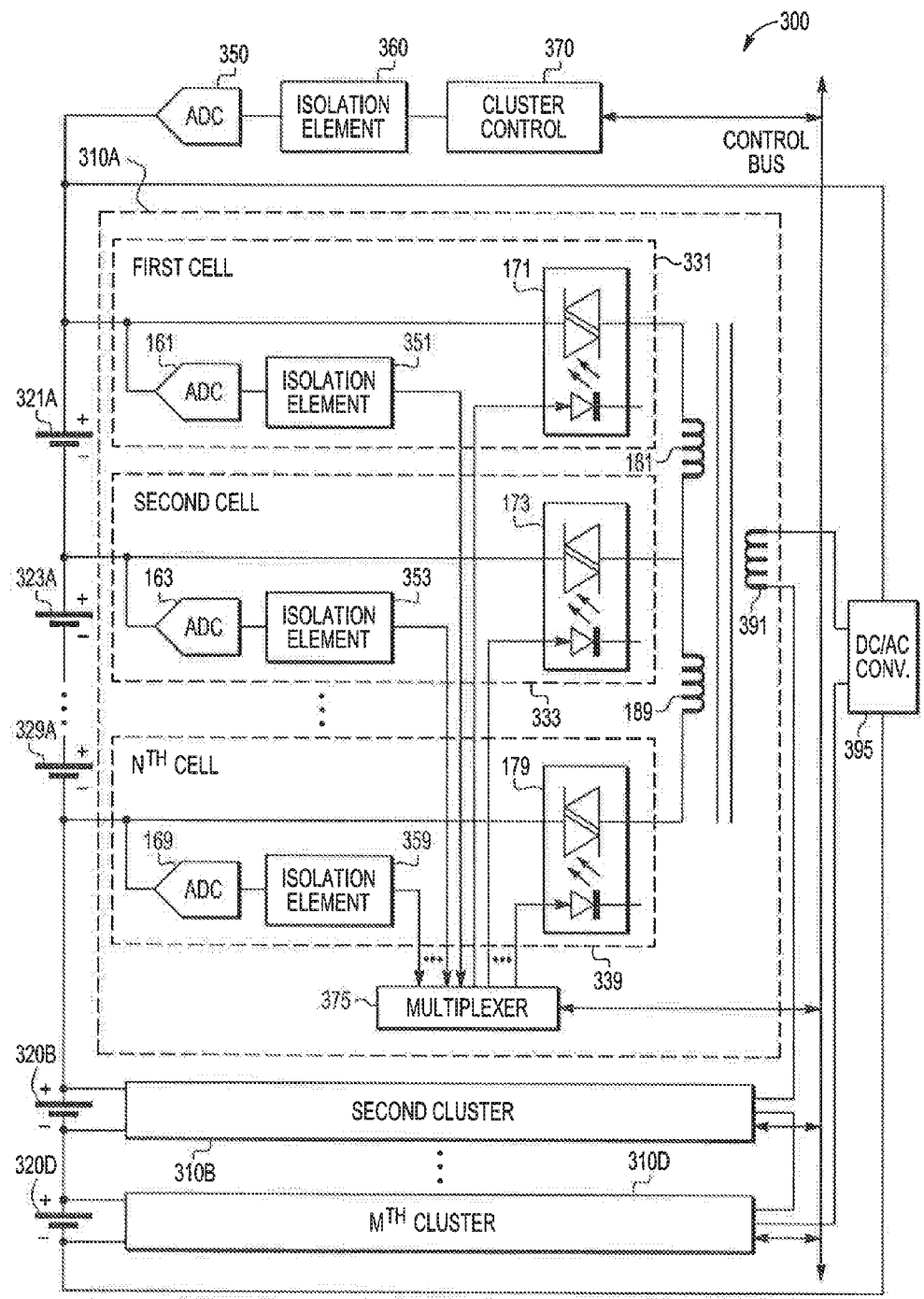
FIG. 3 is a circuit diagram of a cluster for use in a multiple-cell battery equalization circuit according to a disclosed embodiment.
Figure 4:
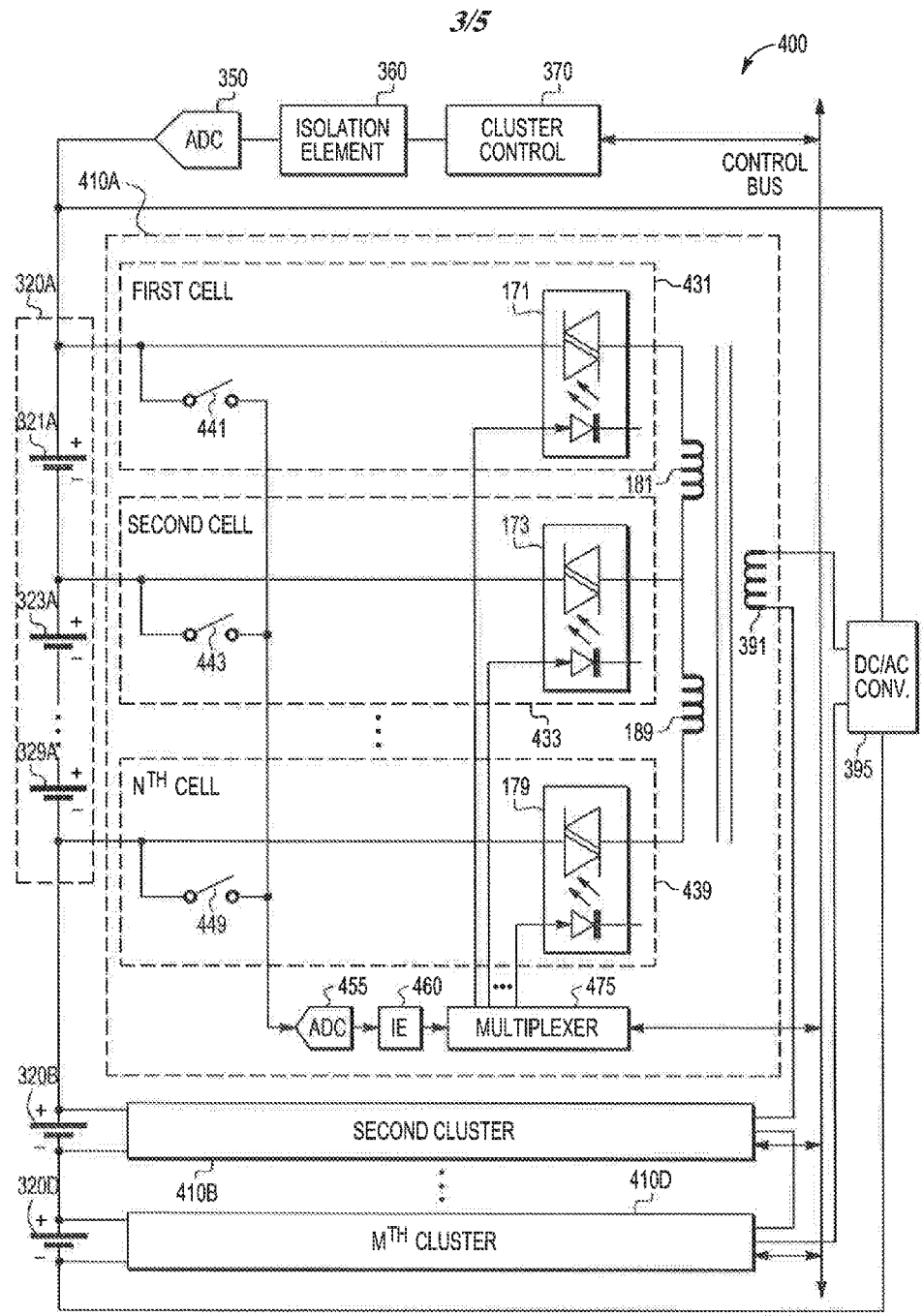
FIG. 4 is a circuit diagram of voltage equalization circuit including a single isolated ADC that serves all battery cells within a cluster, and multiplexing in the analog domain according to a disclosed embodiment.

Two embodiments for reading and multiplexing the voltage of each battery cell are provided in FIGS. 3 and 4. FIG. 3 is a circuit diagram of a voltage equalization circuit using an isolated ADC for each battery cell, and multiplexing in the digital domain. FIG. 4 is a circuit diagram of voltage equalization circuit including a single isolated ADC that serves all battery cells within a cluster, and multiplexing in the analog domain.

As shown in FIG. 3, the voltage-equalization circuit 300 includes first through $M^{th}$ clusters 310A, 310B, ..., 310D, a common ADC 350, a the common isolation element 360, a cluster control element 370, and a DC/AC conversion circuit 395. The first through $M^{th}$ clusters 310A, 310B, ..., 310D, are connected to first through $M^{th}$ battery cells 320A, 320B, ..., 320D, respectively, and the first through $M^{th}$ battery cell clusters 320A, 320B, ..., 320D collectively provide DC power to the DC/AC conversion element 395. Each of the first through $M^{th}$ clusters 310A, 310B, ..., 310D, includes first through $N^{th}$ cluster cells 331, 333, ..., 339, and a multiplexer 375 for receiving a plurality of digital voltage values from the cluster, and providing a plurality of control signals. The multiple-cell battery cluster 320 includes first through $N^{th}$ battery cells 321, 329 arranged in series with each other. Each of the first through $N^{th}$ cluster cells 331, 339 further includes a cell ADC 161, 163, ..., 169, a cell isolation element 351, 353, ... 359, and a triac 171, 173, ..., 179.

The first multiple-cell battery cluster 320A includes first through $N^{th}$ battery cells 321A, 323A, 329A arranged in series with each other. In this way, each of the first through $N^{th}$ battery cells 321A, 323A, 329A combine to provide a total voltage for the battery cluster 320A. In addition, although the second battery cluster 320B and the $M^{th}$ battery cluster 320D are shown as single battery elements, this is representational only. Each of the second through $M^{th}$ battery clusters 320B, ..., 320D are configured the same as the first battery cluster 320A.

The first through $N^{th}$ cluster cells 331, 333, ..., 339 are connected to the first through $N^{th}$ battery cells 321A, 323A, 329A, respectively, in the first battery cluster 320A. Each cluster cell 331, 333, ..., 339 has a connections line, which is connected to the positive and terminal (node) of a corresponding battery cell.

In each of the first through $N^{th}$ cluster cells 331, 333, ..., 339, the secondary transformer winding 385 is connected to the connection line. It is wrapped around a transformer core (not shown) so that it can receive an AC signal from an AC signal generator (not shown) through the transformer core.

The triac 171, 173, ..., 179 in each cluster cell is provided in the connection lines, between the secondary transformer winding 385 and the respective battery cell. Each triac 171, 173, ..., 179 operates based on a control signal provided by the cluster control circuit 360, and provided through the control bus and the multiplexer 375.

When activated, the triac 171, 173, ..., 179 becomes conductive, allowing current to flow through it in either direction. Thus, the triacs 171, 173, ..., 179 operate as bi-directional switches between a secondary transformer winding 385 in the cluster cell and a respective battery cell. In this embodiment, the triacs 171, 173, ..., 179 are each optically-coupled triacs that are controlled by the operation of a light-emitting diode in the triac. Because of this, the triacs 171, 173, ..., 179 are electrically isolated from the cluster control circuit 360 and multiplexer 375 that control the operation of the light-emitting diodes in the optically-coupled triacs 171, 173, ..., 179.

The cell ADC 161, 163, ..., 169 measures an analog voltage for a corresponding battery cell, and converts it to a measured digital voltage, which it provides to the cluster control element 370 via the multiplexer 375 and the control bus.

The cell isolation elements 351, 353, ..., 359 are located between corresponding cell ADCs 161, 163, ..., 169 and the multiplexer 375, and serve to electrically isolate the cell ADCs 161, 163, ..., 169 from the multiplexer 375 and subsequent circuitry.

The common ADC 350 is connected to a positive terminal of the entire battery, and operates to measure an analog voltage for the entire battery. In addition, the common ADC 350 converts the measured analog battery voltage to a measured digital battery voltage, which it provides to the cluster control element 370.

The common isolation element 360 is located between the common ADC 350 and the cluster control element 370. The common isolation element 360 serves to electrically isolate the common ADC 350 from the cluster control element 370.

The cluster control element 370 provides instructions to the multiplexer 375 via the control bus, telling the multiplexer 375 which cell ADC output to provide the cluster control element 370, and what control signals to provide to the triacs 171, 173, ..., 179. In this way, the cluster control element 370 can control multiplexer 375 to sequentially provide measured digital cell voltages of each of the first through $N^{th}$ battery cells 321A, 323A, ..., 329A in the battery cluster 320A. It can also control the operation of the triacs 171, 173, ..., 179 in the first through $N^{th}$ cluster cells 331, 339 to selectively connect the first through $N^{th}$ battery cells 321, 329 to an AC signal provided to a respective secondary transformer winding 385 so that they can receive an AC signal.

As shown in FIG. 4, the voltage-equalization circuit 400 includes first through $M^{th}$ clusters 310A, 310B, ..., 310D, a common ADC 350, a the common isolation element 360, a cluster control element 370, and a DC/AC conversion circuit 395. The first through $M^{th}$ clusters 310A, 310B, ..., 310D, are connected to first through $M^{th}$ battery cells 320A, 320B, ..., 320D, respectively, and the first through ML battery cell clusters 320A, 320B, ..., 320D collectively provide DC power to the DC/AC conversion element 395. Each of the first through $M^{th}$ clusters 310A, 310B, ..., 310D, includes first through $N^{th}$ cluster cells 331, 333, ..., 339, a cluster ADC 455, a cluster isolation element 460, and a multiplexer 475 for providing a plurality of control signals to the cluster cells 441, 443, ..., 449. The multiple-cell battery cluster 320 includes first through $N^{th}$ battery cells 321, 329 arranged in series with each other. Each of the first through $N^{th}$ cluster cells 331, 339 further includes a cell switch 441, 443, ..., 449, and a triac 171, 173, ..., 179.

The voltage-equalization circuit 400 of FIG. 4 operates essentially as the voltage-equalization circuit 300 of FIG. 3. As a result, only the differences between these two circuits will be described.

The voltage-equalization circuit 400 differs from the voltage-equalization circuit 300 in that individual cells do not include a cell ADC or a cell isolation element. Instead, each individual cell includes a cell switch 441, 443, . . . , 439, while the cluster as a whole includes a cluster ADC 455 and a cluster isolation element 460.

As a result, the multiplexer 475 does not have to choose between multiple voltage readings from multiple cell ADCs. Rather, the cell switches 441, 443, . . . , 439 need to be activated to connect one of the battery cells to the cluster ADC 455, so that the ADC 455 can read the analog voltage of that battery cell and convert it to a digital voltage.

The cluster isolation element 460 is located between the roster ADC 455 and the multiplexer 475. The cluster isolation element 460 serves to electrically isolate the cluster ADC 455 from the multiplexer 475.

The multiplexer 475 controls the operation of the triacs 171, 173, . . . , 179 as in the embodiment of FIG. 3. In addition, although not shown, the multiplexer can also provide control signals to the cell switches 441, 443, . . . , 439, identifying which should be connected to the cluster ADC 455 at what time.

In alternate embodiments, the connection lines in some of the cells in a cluster can be arranged such that some of the battery cells in a battery cluster have their positive terminal connected to an upper winding of a corresponding secondary transformer winding and their negative terminal connected to a lower winding of the corresponding secondary transformer winding, while the connection lines in other of the cells in the cluster can be arranged such that the other battery cells in the battery cluster have their negative terminal connected to an upper winding of a corresponding secondary transformer winding and their positive terminal connected to a lower winding of the corresponding secondary transformer winding. In one particular embodiment, half of the cells are arranged in one of these formats and the other half of cells arranged in the other format.

A battery equalization circuit is provided, comprising: a primary battery equalization cluster comprising N primary cluster cells; a central control circuit configured to control the operation of the primary battery equalization cluster, and to provide signals to a data bus; and an isolation element connected between the control circuit and the data bus, the isolation element being configured to provide electrical isolation between the control circuit and the data bus, wherein an $i^{th}$ primary cluster cell further comprises an $i^{th}$ positive primary battery node configured to connect to a positive node of an $i^{th}$ monitored primary battery cell contained in a primary battery circuit that includes N primary battery cells connected in series with each other, an $i^{th}$ negative primary battery node configured to connect to a negative node of the $i^{th}$ monitored primary battery cell, an $i^{th}$ primary transformer winding configured to receive an output voltage of an AC generator, the $i^{th}$ primary transformer winding having an ith upper primary transformer node and an $i^{th}$ lower primary transformer node, an $i^{th}$ upper primary triac connected between the $i^{th}$ positive primary battery node and the $i^{th}$ upper primary transformer node, and an $i^{th}$ lower primary triac connected between the $i^{th}$ negative primary battery node and the $i^{th}$ lower primary transformer node, the control circuit is configured to control the operation of the $i^{th}$ upper primary triac and the $i^{th}$ lower primary triac based on an $i^{th}$ measured primary cell voltage between the $i^{th}$ positive primary battery node and the $i^{th}$ negative primary battery node, and a total primary battery voltage of the primary battery circuit, and i is an integer index that varies from 1 to N.

The battery equalization circuit may further comprise: a secondary battery equalization cluster comprising M secondary cluster cells, wherein a $j^{th}$ secondary cluster cell further comprises a $j^{th}$ positive secondary battery node configured to connect to a positive node of a jth monitored secondary battery cell contained in a secondary battery circuit that includes N secondary battery cells connected in series with each other, a $j^{th}$ negative secondary battery node configured to connect to a negative node of the jth monitored secondary battery cell, a $j^{th}$ secondary transformer winding configured to receive the output voltage of the AC generator, the $j^{th}$ secondary transformer winding having a $j^{th}$ upper secondary transformer node and an $j^{th}$ lower secondary transformer node, a $j^{th}$ upper secondary triac connected between the $j^{th}$ positive secondary battery node and the $j^{th}$ upper secondary transformer node, and a $j^{th}$ lower secondary triac connected between the $j^{th}$ negative secondary battery node and the $j^{th}$ lower secondary transformer node, the control circuit is further configured to control the operation of the $j^{th}$ upper secondary triac and the $j^{th}$ lower secondary triac based on a $j^{th}$ measured secondary cell voltage between the $j^{th}$ positive secondary battery node and the $j^{th}$ negative secondary battery node, and a total secondary battery voltage of the secondary battery circuit, the central control circuit is further configured to provide signals to the data bus, and j is an integer index that varies from 1 to M.

An $i^{th}$ primary cluster cell may further comprise: an $i^{th}$ primary voltage measuring circuit connected between the $i^{th}$ positive primary battery node and the an $i^{th}$ negative primary battery node, and configured to determine an $i^{th}$ primary analog cell voltage; and an $i^{th}$ primary analog-to-digital converter configured to convert the $i^{th}$ primary analog cell voltage into an $i^{th}$ primary digital cell voltage, wherein the control circuit uses the $i^{th}$ primary digital cell voltage as the $i^{th}$ measured primary cell voltage.

The battery equalization circuit may further comprise: an $i^{th}$ upper primary switch connected between the $i^{th}$ positive primary battery node and the control circuit; and an $i^{th}$ lower primary switch connected between the $i^{th}$ negative primary battery node and the control circuit; wherein the control circuit controls the operation of the ith upper primary switch and the $i^{th}$ lower primary switch; the control circuit further comprises a voltage measuring circuit connected to the $i^{th}$ upper primary switch and the $i^{th}$ lower primary switch, and is configured to measure an $i^{th}$ primary analog cell voltage of the $i^{th}$ monitored primary battery cell when the $i^{th}$ upper primary switch and the $i^{th}$ lower primary switch are both closed, and an analog-to-digital converter configured to convert the $i^{th}$ primary analog cell voltage into an $i^{th}$ primary digital cell voltage, and the control circuit uses the $i^{th}$ primary digital cell voltage as the $i^{th}$ measured primary cell voltage.

Battery Equalization Circuit with Multiple Voltage-Equalization Clusters

Figure 5:
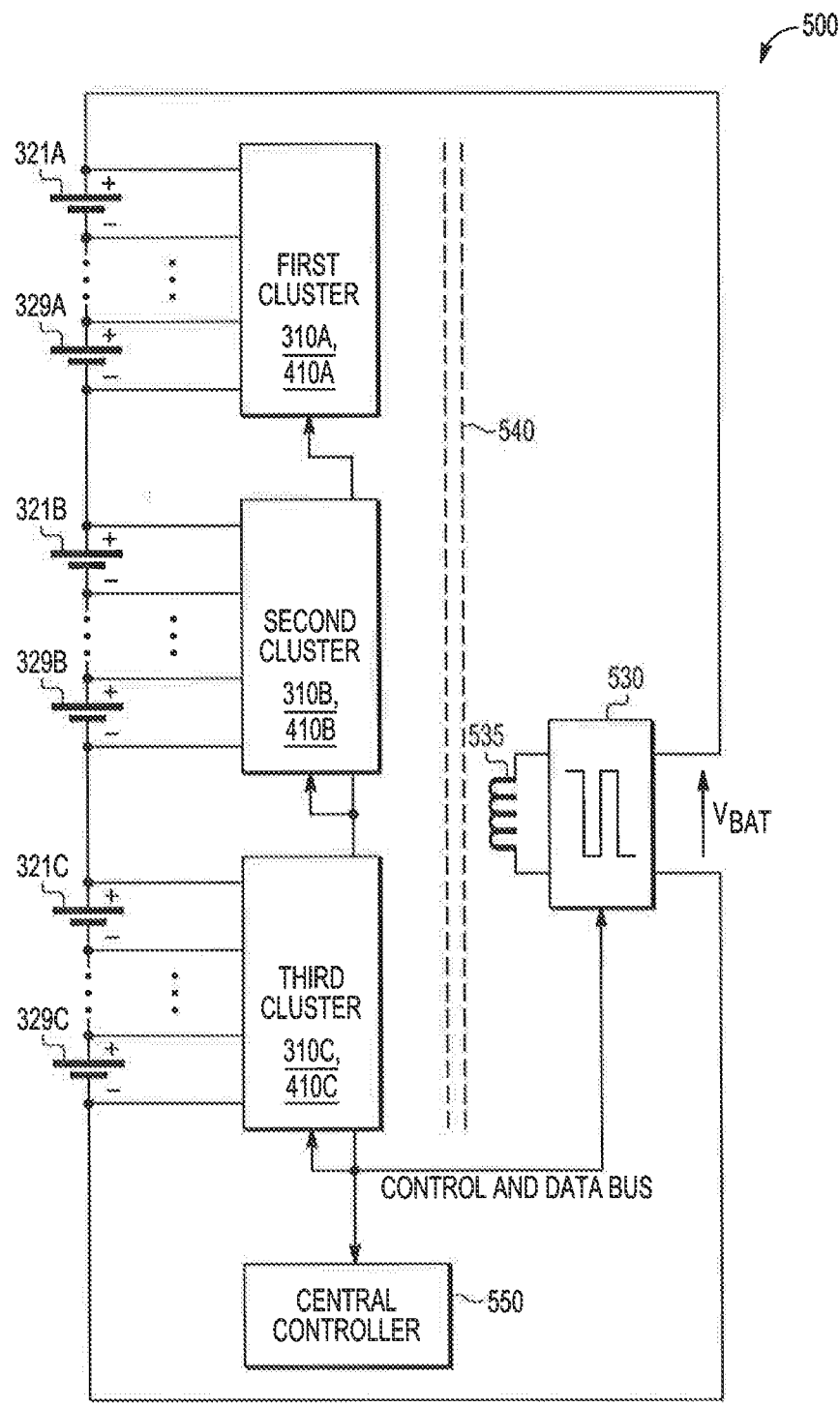
FIG. 5 is a circuit diagram of a multiple-cell battery and a battery equalization circuit having a plurality of clusters according to a disclosed embodiment.

FIG. 5 is a circuit diagram of a multiple-cell battery and a battery equalization circuit 500 having a plurality of clusters 310A, 310B, 310C, 410A, 410B, 410C according to a disclosed embodiment. As shown in FIG. 5, the multiple-cell battery and a battery equalization circuit 400 includes first through third voltage-equalization clusters 310A, 310B, 310C, 410A, 410B, 410C, first through third battery clusters 320A, 320B, 320C, an AC signal generator 530, a primary transformer winding 535, a transformer core 540, and a central controller 550.

The first through third voltage-equalization clusters 310A, 310B, 310C, 410A, 410B, 410C and the first through third battery clusters 320A, 320B, 320C each operate as described above with respect to FIG. 3. Each voltage-equalization clusters 310A, 310B, 310C, 410A, 410B, 410C serves to equalize the voltage in the battery cells (e.g., 321A, 329A, 321B, 329B, 321C, 329C) contained in the first through third battery clusters 320A, 320B, 320C. The first through third battery clusters 320A, 320B, 320C are arranged in series to provide a total battery voltage.

An isolated common ADC can be provided to measure the voltage of the entire set of battery clusters (i.e., the entire battery voltage), and provide that total battery voltage measurement to the central controller 550 in a manner similar to that shown in FIGS. 3 and 4.

The AC signal generator 530 operates to provide an AC signal to the primary transformer winding 535. In this embodiment, the AC signal is a square wave signal. However, in alternate embodiments this AC signal can be any appropriate bidirectional signal.

In the disclosed embodiment, the AC signal generator 430 is powered by the entire voltage of the multiple-cell battery (i.e., a total voltage of the battery clusters 320A, 320B, 320C). In this way, the AC signal generator 530 receives the full voltage of the entire battery and converts it onto the AC signal (i.e., the square wave). Furthermore, by powering the AC signal generator 530 from the whole battery voltage, the amplitude of the AC signal is proportional to the voltage of the entire battery. Thus, if the central controller 550 is provided with the amplitude of the AC signal, it can easily pre-determine the total battery voltage (although a precise value of the total battery voltage is determined by an isolated common ADC).

The primary transformer winding 535 receives the AC signal generated by the AC signal generator 530 and provides it to the secondary transformer windings 385 in each of the cluster cells 331, 339 in each of the voltage-equalization clusters 310A, 310B, 310C, 410A, 410B, 410C via the transformer core 540. By providing the AC signal to the cluster cells (e.g., 331, . . . , 339) via a transformer (primary transformer winding 435, transformer core 440, secondary transformer winding 385), the multiple-cell battery and a battery equalization circuit 400 electrically isolates the voltage-equalization clusters 310A, 310B, 310C and the battery clusters 320A, 320B, 320C from the AC signal generator 430.

The central controller 450 communicates with the first through third voltage-equalization clusters 310A, 310B, 310C, and the AC signal generator 430 through a control and data bus. It provides each with all of the control signals they need to operate properly. As noted above with respect to FIGS. 3 and 4, the voltage-equalization clusters 310A, 310B, 310C, 410A, 410B, 410C each include various isolation elements that electrically isolate them from the control and data bus. Since the voltage-equalization clusters 310A, 310B, 310C, 410A, 410B, 410C are isolated from the AC signal generator 530 by the transformer, 530, 540, 385, and are isolated from the central controller 550 by the respective isolation elements, the voltage-equalization clusters 310A, 310B, 310C, 410A, 410B, 410C are completely isolated.

Method of Battery Equalization

Figure 6:
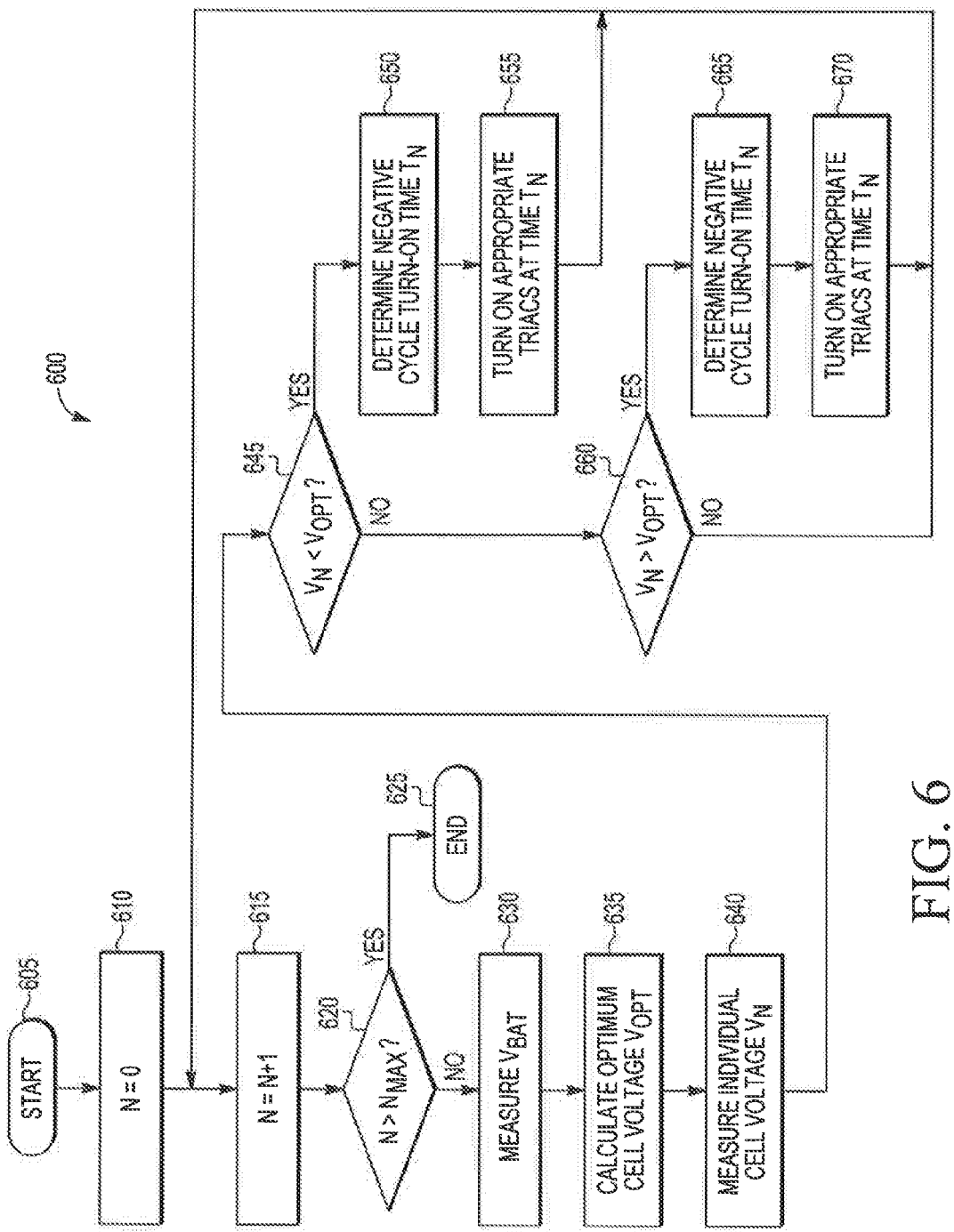
FIG. 6 is flow chart of a battery equalization operation according to a disclosed embodiment.

FIG. 6 is flow chart of a battery equalization operation 600 according to a disclosed embodiment. This operation can be performed on an entire multiple-cell battery or on a multiple-cell battery cluster formed in a multiple-cluster battery. A goal of this operation 600 is to equalize the voltages in each of a plurality of battery cells such that they are all at approximately the same voltage, or that they are at least all approaching the same voltage.

As shown in FIG. 6, this operation 600 starts (605) and a value of N is set equal to 0. (610) N is an index of the battery cells that are formed together in the associated battery or battery cluster and so must be equalized. $N_{MAX}$ represents the total number of battery cells in the associated battery or battery cluster.

N is then incremented by one (615) to represent moving on to the next battery cell to be equalized. On the first pass through this step, N is incremented from 0 to 1, indicating that the first battery cell is to be equalized. Once the last battery cell has been equalized, this step will increment N from $N_{MAX}$ to ($N_{MAX}$+1).

The operation 500 then determines whether N is greater than $N_{MAX}$, i.e., whether the last battery cell has been equalized. (620) If N is greater than $N_{MAX}$ (i.e., every battery cell has been equalized), the process will end. (625) If N is not greater than $N_{MAX}$, (i.e., not every battery cell has been equalized), then the operation 500 proceeds to measure the total battery voltage $V_{BAT}$ of the battery or battery cluster. (630) The total battery voltage $V_{BAT}$ is the sum of the voltages of the $N_{MAX}$ battery cells that make up the battery.

An optimum cell voltage $V_{OPT}$ is then calculated based on the total battery voltage $V_{BAT}$. (635) In the disclosed embodiments, the optimum cell voltage $V_{OPT}$ is equal to the total battery voltage $V_{BAT}$ divided by the total number of battery cells $N_{MAX}$ $$\left(\text{i.e., } V_{OPT} = \frac{V_{BAT}}{N_{MAX}}\right).$$

Then an individual cell voltage $V_N$ is determined. (640) This individual cell voltage $V_N$ is the voltage of the $N^{th}$ battery cell (for the current value of N). As noted above in FIGS. 1, 3, and 4, there are various ways in which this individual cell voltage $V_N$ can be measured.

The operation 500 then determines whether the individual cell voltage $V_N$ is less than $V_{OPT}$ (i.e., whether the $N^{th}$ battery cell is undercharged with respect to the optimum voltage $V_{OPT}$). (645)

If the individual cell voltage $V_N$ is less than $V_{OPT}$ (i.e., the $N^{th}$ battery cell is undercharged), then it will be necessary to charge the $N^{th}$ battery cell to increase its voltage. This is accomplished by determining how long during a positive cycle of the AC signal (the square wave signal in the disclosed embodiment) the $N^{th}$ battery cell should be connected to the AC signal. If this connection is being made through the use of triacs (as disclosed in FIGS. 1, 3, and 4), then a charging/discharging stopping point will already be known, since the triacs will turn non-conductive at the next zero crossing of the AC signal after they are activated. Therefore, with a desired amount of charge and a known ending point, it is only necessary to determine a start point within a positive half-cycle of the AC signal to achieve the desired amount of charging for the $N^{th}$ battery cell.

Therefore, the operation determines a positive cycle turn-on time $T_P$ that will provide the desired amount of charging (650), and turns on the appropriate triacs (i.e., sets them to be conductive) at time $T_P$ to connect the $N^{th}$ battery cell to the positive half-cycle of the AC signal at time $T_P$. (655) As noted above, the $N^{th}$ battery cell will automatically be disconnected from the AC signal when the positive half-cycle ends, the AC signal has a zero crossing, and the triacs will shut off (i.e., become non-conductive).

The operation 500 then determines whether the individual cell voltage $V_N$ is greater than $V_{OPT}$ (i.e., whether the $N^{th}$ battery cell is overcharged with respect to the optimum voltage $V_{OPT}$). (660)

If the individual cell voltage $V_N$ is greater than $V_{OPT}$ (i.e., the $N^{th}$ battery cell is overcharged), then it will be necessary to discharge the $N^{th}$ battery cell to decrease its voltage. This is accomplished by determining how long during a negative cycle of the AC signal (the square wave signal in the disclosed embodiment) the $N^{th}$ battery cell should be connected to the AC signal. If this connection is being made through the use of triacs (as disclosed in FIGS. 1, 3, and 4), then a charging/discharging stopping point will already be known, since the triacs will turn non-conductive at the next zero crossing of the AC signal after they are activated. Therefore, with a desired amount of discharge and a known ending point, it is only necessary to determine a start point within a negative half-cycle of the AC signal to achieve the desired amount of discharging for the $N^{th}$ battery cell.

Therefore, the operation determines a negative cycle turn-on time $T_N$ that will provide the desired amount of discharging (665), and turns on the appropriate triacs (i.e., sets them to be conductive) at time $T_N$ to connect the $N^{th}$ battery cell to the negative half-cycle of the AC signal at time $T_N$. As noted above, the $N^{th}$ battery cell will automatically be disconnected from the AC signal when the negative half-cycle ends, the AC signal has a zero crossing, and the triacs will shut off (i.e., become non-conductive).

If the individual cell voltage $V_N$ is neither greater than nor less than the optimum voltage $V_{OPT}$, the $N^{th}$ battery cell has the optimum voltage $V_{OPT}$, and no correction need be made.

Once any necessary voltage optimization is performed (either through charging or discharging the $N^{th}$ battery cell), operation returns to step 615, where N is incremented by 1, moving to the next battery cell, and operation continues.

In this way, every battery cell in a battery or battery cluster can be checked and equalized. In this embodiment the total battery voltage $V_{BAT}$ is newly measured during the equalization operation of a given battery cell. This is because the total voltage of the battery will fluctuate slightly as individual battery cells are charged and discharged. However, in alternate embodiments the total battery voltage $V_{BAT}$ could be measured once at the beginning of the battery equalization process and that value for $V_{BAT}$ could be used for the first through $N_{MAX}^{th}$ battery cells.

A method of equalizing a battery is provided, including: measuring a total voltage of a battery containing N battery cells arranged in series with each other; determining an optimum cell voltage based on the measured total voltage and the value of N; measuring a selected cell voltage of a selected battery cell from the N battery cells; determining whether the measured cell voltage is less than the optimum cell voltage; connecting the selected battery cell to a voltage output of a generator during a portion of a positive cycle of the voltage output of the generator, when it is determined that the measured cell voltage is less than the optimum cell voltage; determining whether the measured cell voltage is greater than the optimum cell voltage; and connecting the selected battery cell to the voltage output of the generator during a negative cycle of the voltage output of the generator, when it is determined that the measured cell voltage is greater than the optimum cell voltage, where N is an integer greater than 1.

The optimum cell voltage may be equal to the measured total voltage divided by the total number of the battery cells in the plurality of battery cells.

The operations of measuring the total voltage of the battery, determining the optimum cell voltage, measuring the selected cell voltage, determining whether the measured cell voltage is less than the optimum cell voltage, connecting the selected battery cell to the voltage output of a generator during a positive cycle of the generator when it is determined that the measured cell voltage is less than the optimum cell voltage, determining whether the measured cell voltage is greater than the optimum cell voltage, and connecting the selected battery cell to the voltage output of the generator during a negative cycle of the generator when it is determined that the measured cell voltage is greater than the optimum cell voltage may be repeated N times to allow each of the N battery cells to serve as the selected cell once.

The operation of connecting the selected battery cell to the voltage output of a generator during a positive cycle of the generator when it is determined that the measured cell voltage is less than the optimum cell voltage may further comprise: determining a connection duration of the positive cycle during which the selected cell should be connected to the voltage output of the generator, determining a connection starting point during the positive cycle at which the selected cell should be connected to the voltage output of the generator so that the selected cell will be connected to the voltage output of the generator for the connection duration, when a connection ending point during the positive cycle at which the selected cell will be disconnected from the voltage output of the generator is a zero crossing of the voltage output of the generator, connecting the selected battery cell to the voltage output of the generator at the determined connection starting point; and disconnecting the selected battery cell from the voltage output of the generator at a next zero crossing of the voltage output of the generator.

The operation of connecting the selected battery cell to the voltage output of the generator at the determined connection starting point may further comprise: activating a first triac connected between a positive terminal of the selected battery cell and a first terminal of the output voltage of the generator to connect the positive terminal of selected battery cell to the first terminal of the output voltage of the generator; and activating a second triac connected between a negative terminal of the selected battery cell and a second terminal of the output voltage of the generator to connect the negative terminal of selected battery cell to the second terminal of the output voltage of the generator.

The selected battery cell may be connected to the output voltage of the generator through a transformer.

The operation of connecting the selected battery cell to the voltage output of a generator during a negative cycle of the generator when it is determined that the measured cell voltage is greater than the optimum cell voltage may further comprise: determining a connection duration of the negative cycle during which the selected cell should be connected to the voltage output of the generator; determining a connection starting point during the negative cycle at which the selected cell should be connected to the voltage output of the generator so that the selected cell will be connected to the voltage output of the generator for the connection duration, when a connection ending point during the positive cycle at which the selected cell will be disconnected from the voltage output of the generator is a zero crossing of the voltage output of the generator; connecting the selected battery cell to the voltage output of the generator at the determined connection starting point; and disconnecting the selected battery cell from the voltage output of the generator at a next zero crossing of the voltage output of the generator.

The operation of connecting the selected battery cell to the voltage output of the generator at the determined connection starting point may further comprise: activating a first triac connected between a positive terminal of the selected battery cell and a first terminal of the output voltage of the generator to connect the positive terminal of selected battery cell to the first terminal of the output voltage of the generator, and activating a second triac connected between a negative terminal of the selected battery cell and a second terminal of the output voltage of the generator to connect the negative terminal of selected battery cell to the second terminal of the output voltage of the generator.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of equalizing a battery, including:
measuring a total voltage of a battery containing N battery cells arranged in series with each other;
determining an optimum cell voltage based on the measured total voltage and the value of N;
measuring a selected cell voltage of a selected battery cell from the N battery cells;
determining whether the measured cell voltage is less than the optimum cell voltage;
connecting the selected battery cell to a voltage output of a generator during a portion of a positive cycle of the voltage output of the generator, when it is determined that the measured cell voltage is less than the optimum cell voltage;
determining whether the measured cell voltage is greater than the optimum cell voltage; and
connecting the selected battery cell to the voltage output of the generator during a negative cycle of the voltage output of the generator, when it is determined that the measured cell voltage is greater than the optimum cell voltage,
where N is an integer greater than 1;
wherein the operations of measuring the total voltage of the battery, determining the optimum cell voltage, measuring the selected cell voltage, determining whether the measured cell voltage is less than the optimum cell voltage, connecting the selected battery cell to the voltage output of a generator during a positive cycle of the generator when it is determined that the measured cell voltage is less than the optimum cell voltage, determining whether the measured cell voltage is greater than the optimum cell voltage, and connecting the selected battery cell to the voltage output of the generator during a negative cycle of the generator when it is determined that the measured cell voltage is greater than the optimum cell voltage are repeated N times to allow each of the N battery cells to serve as the selected cell once.

2. The method of claim 1, wherein the optimum cell voltage is equal to the measured total voltage divided by the total number of the battery cells in the plurality of battery cells.

3. A method of equalizing a battery, including:
measuring a total voltage of a battery containing N battery cells arranged in series with each other;
determining an optimum cell voltage based on the measured total voltage and the value of N;
measuring a selected cell voltage of a selected battery cell from the N battery cells;
determining whether the measured cell voltage is less than the optimum cell voltage;
connecting the selected battery cell to a voltage output of a generator during a portion of a positive cycle of the voltage output of the generator, when it is determined that the measured cell voltage is less than the optimum cell voltage;
determining whether the measured cell voltage is greater than the optimum cell voltage; and
connecting the selected battery cell to the voltage output of the generator during a negative cycle of the voltage output of the generator, when it is determined that the measured cell voltage is greater than the optimum cell voltage,
where N is an integer greater than 1;
wherein the operation of connecting the selected battery cell to the voltage output of a generator during a positive cycle of the generator when it is determined that the measured cell voltage is less than the optimum cell voltage further comprises:
determining a connection duration of the positive cycle during which the selected cell should be connected to the voltage output of the generator;
determining a connection starting point during the positive cycle at which the selected cell should be connected to the voltage output of the generator so that the selected cell will be connected to the voltage output of the generator for the connection duration, when a connection ending point during the positive cycle at which the selected cell will be disconnected from the voltage output of the generator is a zero crossing of the voltage output of the generator;
connecting the selected battery cell to the voltage output of the generator at the determined connection starting point; and
disconnecting the selected battery cell from the voltage output of the generator at a next zero crossing of the voltage output of the generator.

4. The method of claim 3, wherein the operation of connecting the selected battery cell to the voltage output of the generator at the determined connection starting point further comprises:
activating a first triac connected between a positive terminal of the selected battery cell and a first terminal of the output voltage of the generator to connect the positive terminal of selected battery cell to the first terminal of the output voltage of the generator; and activating a second triac connected between a negative terminal of the selected battery cell and a second terminal of the output voltage of the generator to connect the negative terminal of selected battery cell to the second terminal of the output voltage of the generator.

5. The method of claim 4, wherein the selected battery cell is connected to the output voltage of the generator through a transformer.

6. A method of equalizing a battery, including:
measuring a total voltage of a battery containing N battery cells arranged in series with each other;
determining an optimum cell voltage based on the measured total voltage and the value of N;
measuring a selected cell voltage of a selected battery cell from the N battery cells;
determining whether the measured cell voltage is less than the optimum cell voltage;
connecting the selected battery cell to a voltage output of a generator during a portion of a positive cycle of the voltage output of the generator, when it is determined that the measured cell voltage is less than the optimum cell voltage;
determining whether the measured cell voltage is greater than the optimum cell voltage; and
connecting the selected battery cell to the voltage output of the generator during a negative cycle of the voltage output of the generator, when it is determined that the measured cell voltage is greater than the optimum cell voltage,
where N is an integer greater than 1;
wherein the operation of connecting the selected battery cell to the voltage output of a generator during a negative cycle of the generator when it is determined that the measured cell voltage is greater than the optimum cell voltage further comprises:
determining a connection duration of the negative cycle during which the selected cell should be connected to the voltage output of the generator;
determining a connection starting point during the negative cycle at which the selected cell should be connected to the voltage output of the generator so that the selected cell will be connected to the voltage output of the generator for the connection duration, when a connection ending point during the positive cycle at which the selected cell will be disconnected from the voltage output of the generator is a zero crossing of the voltage output of the generator;
connecting the selected battery cell to the voltage output of the generator at the determined connection starting point; and
disconnecting the selected battery cell from the voltage output of the generator at a next zero crossing of the voltage output of the generator.

7. The method of claim 6, wherein the operation of connecting the selected battery cell to the voltage output of the generator at the determined connection starting point further comprises:
activating a first triac connected between a positive terminal of the selected battery cell and a first terminal of the output voltage of the generator to connect the positive terminal of selected battery cell to the first terminal of the output voltage of the generator; and
activating a second triac connected between a negative terminal of the selected battery cell and a second terminal of the output voltage of the generator to connect the negative terminal of selected battery cell to the second terminal of the output voltage of the generator.

8. The method of claim 7, wherein the selected battery cell is connected to the output voltage of the generator through a transformer.

9. A method of equalizing a plurality of battery cells by a battery equalization circuit, the method comprising:
measuring a total voltage of the plurality of battery cells containing N battery cells, where N is an integer greater than 1;
determining by a control circuit of the battery equalization circuit an optimum cell voltage based on the measured total voltage and the value of N;
measuring a selected cell voltage of a selected battery cell from the plurality of battery cells;
determining by the control circuit whether the measured cell voltage is less than or greater than the optimum cell voltage;
if it is determined that that the measured cell voltage is less than the optimum cell voltage, connecting the selected battery cell to a voltage output of a generator during a portion of a positive cycle of the voltage output of the generator;
if it is determined that that the measured cell voltage is greater than the optimum cell voltage, connecting the selected battery cell to the voltage output of a generator during a portion of a negative cycle of the voltage output of the generator;
wherein the operations of measuring the total voltage of the battery, determining the optimum cell voltage, measuring the selected cell voltage, determining whether the measured cell voltage is less than or greater than the optimum cell voltage, if it is determined that that the measured cell voltage is less than the optimum cell voltage, connecting the selected battery cell to a voltage output of a generator during a portion of a positive cycle of the voltage output of the generator, and if it is determined that that the measured cell voltage is greater than the optimum cell voltage, connecting the selected battery cell to the voltage output of a generator during a portion of a negative cycle of the voltage output of the generator are repeated N times to allow each of the N battery cells of the plurality of battery cells to serve as the selected cell.

10. The method of claim 9, wherein the optimum cell voltage is equal to the measured total voltage divided by N.

11. A method of equalizing a plurality of battery cells by a battery equalization circuit, the method comprising:
measuring a total voltage of the plurality of battery cells containing N battery cells, where N is an integer greater than 1;
determining by a control circuit of the battery equalization circuit an optimum cell voltage based on the measured total voltage and the value of N;
measuring a selected cell voltage of a selected battery cell from the plurality of battery cells;
determining by the control circuit whether the measured cell voltage is less than or greater than the optimum cell voltage;
if it is determined that that the measured cell voltage is less than the optimum cell voltage, connecting the selected battery cell to a voltage output of a generator during a portion of a positive cycle of the voltage output of the generator;
if it is determined that that the measured cell voltage is greater than the optimum cell voltage, connecting the selected battery cell to the voltage output of a generator during a portion of a negative cycle of the voltage output of the generator;

wherein the operation of connecting the selected battery cell to a voltage output of a generator during a portion of a positive cycle of the voltage output of the generator further comprises:
    determining by the control circuit, a connection duration of the positive cycle during which the selected cell should be connected to the voltage output of the generator;
    determining by the control circuit, a connection starting point during the positive cycle at which the selected cell should be connected to the voltage output of the generator so that the selected cell will be connected to the voltage output of the generator for the connection duration, when a connection ending point during the positive cycle at which the selected cell will be disconnected from the voltage output of the generator is a zero crossing of the voltage output of the generator;
    connecting the selected battery cell to the voltage output of the generator at the determined connection starting point; and
disconnecting the selected battery cell from the voltage output of the generator at a next zero crossing of the voltage output of the generator.

12. The method of claim 11, wherein the operation of connecting the selected battery cell to the voltage output of the generator at the determined connection starting point further comprises:
    activating a first triac connected between a positive terminal of the selected battery cell and a first terminal of the output voltage of the generator to connect the positive terminal of selected battery cell to the first terminal of the output voltage of the generator; and
activating a second triac connected between a negative terminal of the selected battery cell and a second terminal of the output voltage of the generator to connect the negative terminal of selected battery cell to the second terminal of the output voltage of the generator.

13. The method of claim 12, wherein the selected battery cell is connected to the output voltage of the generator through a transformer.

14. A method of equalizing a plurality of battery cells by a battery equalization circuit, the method comprising:
    measuring a total voltage of the plurality of battery cells containing N battery cells, where N is an integer greater than 1;
    determining by a control circuit of the battery equalization circuit an optimum cell voltage based on the measured total voltage and the value of N;
    measuring a selected cell voltage of a selected battery cell from the plurality of battery cells;
    determining by the control circuit whether the measured cell voltage is less than or greater than the optimum cell voltage;
    if it is determined that that the measured cell voltage is less than the optimum cell voltage, connecting the selected battery cell to a voltage output of a generator during a portion of a positive cycle of the voltage output of the generator;
    if it is determined that that the measured cell voltage is greater than the optimum cell voltage, connecting the selected battery cell to the voltage output of a generator during a portion of a negative cycle of the voltage output of the generator;

wherein the operation of connecting the selected battery cell to the voltage output of a generator during a portion of a negative cycle of the voltage output of the generator further comprises:
    determining by the control circuit, a connection duration of the negative cycle during which the selected cell should be connected to the voltage output of the generator;
    determining by the control circuit, a connection starting point during the negative cycle at which the selected cell should be connected to the voltage output of the generator so that the selected cell will be connected to the voltage output of the generator for the connection duration, when a connection ending point during the positive cycle at which the selected cell will be disconnected from the voltage output of the generator is a zero crossing of the voltage output of the generator;
    connecting the selected battery cell to the voltage output of the generator at the determined connection starting point; and
disconnecting the selected battery cell from the voltage output of the generator at a next zero crossing of the voltage output of the generator.

15. The method of claim 14, wherein the operation of connecting the selected battery cell to the voltage output of the generator at the determined connection starting point further comprises:
    activating a first triac connected between a positive terminal of the selected battery cell and a first terminal of the output voltage of the generator to connect the positive terminal of selected battery cell to the first terminal of the output voltage of the generator; and
activating a second triac connected between a negative terminal of the selected battery cell and a second terminal of the output voltage of the generator to connect the negative terminal of selected battery cell to the second terminal of the output voltage of the generator.

16. The method of claim 15, wherein the selected battery cell is connected to the output voltage of the generator through a transformer.

17. A method of equalizing a plurality of battery cells by a battery equalization circuit, the method comprising:
    measuring a total voltage of the plurality of battery cells containing N battery cells, where N is an integer greater than 1;
    determining by a control circuit of the battery equalization circuit an optimum cell voltage based on the measured total voltage and the value of N;
    measuring a selected cell voltage of a selected battery cell from the plurality of battery cells;
    determining by the control circuit whether the measured cell voltage is less than or greater than the optimum cell voltage;
    if it is determined that that the measured cell voltage is less than the optimum cell voltage, connecting the selected battery cell to a voltage output of a generator during a portion of a positive cycle of the voltage output of the generator;
    if it is determined that that the measured cell voltage is greater than the optimum cell voltage, connecting the selected battery cell to the voltage output of a generator during a portion of a negative cycle of the voltage output of the generator;
wherein an amount of time that the selected battery cell is connected to the voltage output of the generator during the connecting the selected battery cell to a voltage output of a generator during a portion of a positive cycle of the voltage output of the generator or during the connecting the selected battery cell to the voltage output of a generator during a portion of a negative cycle of the voltage output of the generator is dependent upon the difference between the measured cell voltage and the optimum cell voltage.

18. A method of equalizing a battery, including:
measuring a total voltage of a battery containing N battery cells arranged in series with each other;
determining an optimum cell voltage based on the measured total voltage and the value of N;
measuring a selected cell voltage of a selected battery cell from the N battery cells;
determining whether the measured cell voltage is less than the optimum cell voltage;
connecting the selected battery cell to a voltage output of a generator during a portion of a positive cycle of the voltage output of the generator, when it is determined that the measured cell voltage is less than the optimum cell voltage;
determining whether the measured cell voltage is greater than the optimum cell voltage; and
connecting the selected battery cell to the voltage output of the generator during a negative cycle of the voltage output of the generator, when it is determined that the measured cell voltage is greater than the optimum cell voltage,
where N is an integer greater than 1;
wherein the an amount of time that the selected battery cell is connected to the voltage output of the generator during the connecting the selected battery cell to a voltage output of a generator during a portion of a positive cycle of the voltage output of the generator or during the connecting the selected battery cell to the voltage output of the generator during a negative cycle of the voltage output of the generator is dependent upon the difference between the measured cell voltage and the optimum cell voltage.

19. The method of claim 17, wherein the operations of measuring the total voltage of the battery, determining the optimum cell voltage, measuring the selected cell voltage, determining whether the measured cell voltage is less than or greater than the optimum cell voltage, if it is determined that that the measured cell voltage is less than the optimum cell voltage, connecting the selected battery cell to a voltage output of a generator during a portion of a positive cycle of the voltage output of the generator, and if it is determined that that the measured cell voltage is greater than the optimum cell voltage, connecting the selected battery cell to the voltage output of a generator during a portion of a negative cycle of the voltage output of the generator are repeated N times to allow each of the N battery cells of the plurality of battery cells to serve as the selected cell.

20. The method of claim 18, wherein the operations of measuring the total voltage of the battery, determining the optimum cell voltage, measuring the selected cell voltage, determining whether the measured cell voltage is less than the optimum cell voltage, connecting the selected battery cell to the voltage output of a generator during a positive cycle of the generator when it is determined that the measured cell voltage is less than the optimum cell voltage, determining whether the measured cell voltage is greater than the optimum cell voltage, and connecting the selected battery cell to the voltage output of the generator during a negative cycle of the generator when it is determined that the measured cell voltage is greater than the optimum cell voltage are repeated N times to allow each of the N battery cells to serve as the selected cell once.

* * * * *